United States Patent [19]

Fowler

[11] Patent Number: 4,717,411
[45] Date of Patent: Jan. 5, 1988

[54] DRAIN BUSHING

[75] Inventor: Samuel R. Fowler, Tucson, Ariz.

[73] Assignee: Manville Corporation, Denver, Colo.

[21] Appl. No.: 860,290

[22] Filed: May 6, 1986

[51] Int. Cl.[4] .......................................... C03B 37/09
[52] U.S. Cl. ......................................... 65/1; 65/173;
65/327; 65/355; 65/DIG. 4
[58] Field of Search ............... 65/1, 355, 327, DIG. 4,
65/326, 173

[56] References Cited

U.S. PATENT DOCUMENTS

| | | | |
|---|---|---|---|
| 3,511,916 | 5/1970 | Sinclair et al. | 65/1 X |
| 3,554,718 | 1/1971 | Stalego et al. | 65/1 |
| 4,167,403 | 9/1979 | Caggin | 65/1 |
| 4,272,271 | 6/1981 | Thompson | 65/DIG. 4 |
| 4,285,711 | 8/1981 | Willis | 65/DIG. 4 |
| 4,566,888 | 1/1986 | Schaefer | 65/1 |

Primary Examiner—Robert L. Lindsay
Attorney, Agent, or Firm—John D. Lister; Cornelius P. Quinn; Timothy R. Schulte

[57] ABSTRACT

A nonprecious metal drain bushing for use in the start-up of a glass melting furnace. The bottom wall of the bushing is relatively wide and thick and is bent downwardly near the ends of the bottom wall to form integral terminal ears. The end portions of the terminal ears are of reduced thickness for attachment by the power clamp. The side walls coverage at an angle down to the bottom wall to facilitate flow of the molten glass through the bushing, and the thickness of the bottom wall and terminal ears is substantially greater than the thickness of the side and end walls.

9 Claims, 4 Drawing Figures

U.S. Patent Jan. 5, 1988 4,717,411
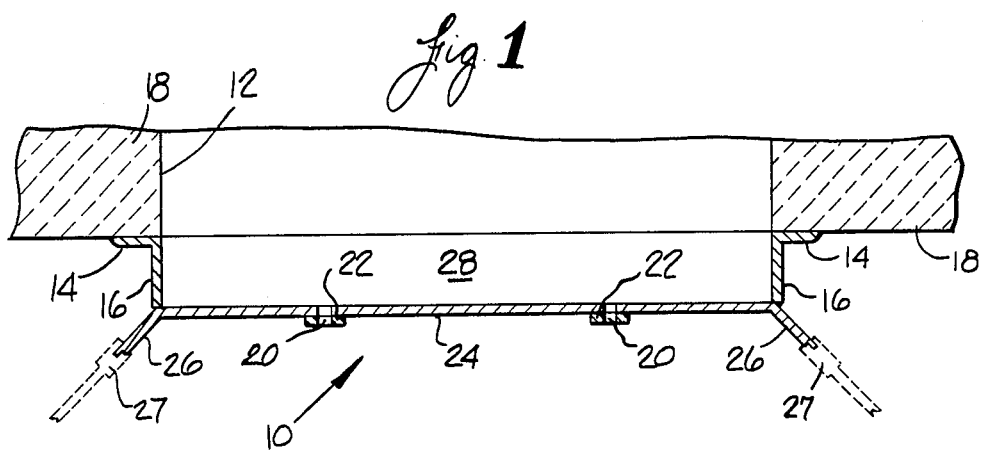
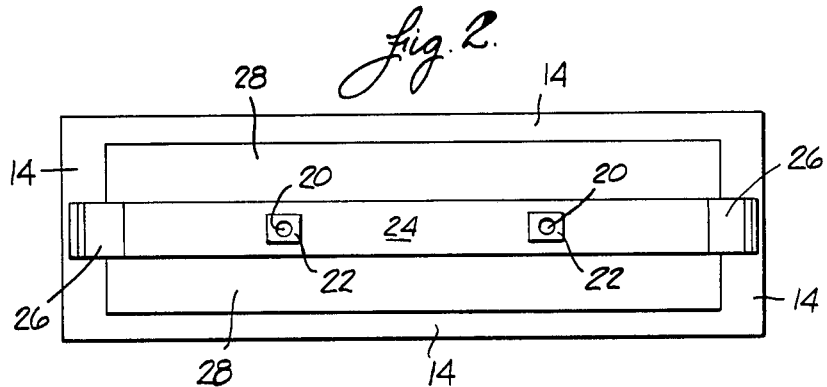
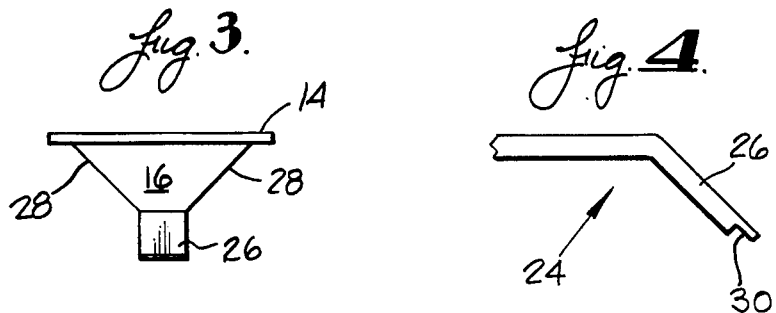

DRAIN BUSHING

FIELD OF THE INVENTION

This invention relates to a drain bushing for use in the start-up of a glass melting furnace, and more particularly to a drain bushing formed of nonprecious metal.

BACKGROUND OF THE PRIOR ART

In the start-up of a new or rebuilt furnace for melting glass in a glass fiberizing process it is necessary to run the furnace for a period of time until the melting process has stabilized and impurities from the construction, such as particles of refractory material, have been flushed from the system. The molten glass in the system during this period is drained through drain bushings, which are electrically heated to very high temperatures to maintain the glass at the proper viscosity and which typically have two or three large drain holes. This is in contrast to the great many very small apertures contained in the fiberizing bushings used in the production of glass filaments.

Fiberizing bushings are normally formed of precious metal, such as platinum/rhodium alloys, which are quite expensive due to the cost of the precious metal and the cost of fabrication. The high cost can be justified by their relatively long life, which is made possible by the erosion resistance of the precious metal. Drain bushings also have been formed of precious metal, but their high cost cannot be justified since their intermittent use for only five to ten days at a time results in the precious metal being tied up during long periods of inactivity. It would be better to use drain bushings formed from nonprecious metal, provided they are able to adequately withstand erosion from the molten glass at least until the draining operation is over, and provided they can be adequately heated to the required temperatures.

The usual vertically arranged relatively thick lug-type terminal typically used with precious metal bushings has not been found to allow satisfactory electrical heating of a nonprecious metal drain bushing. The heat is not dispersed uniformly throughout the bushing, resulting in hot spots which are deleterious to the life of the bushing and which do not promote stable operating conditions. Other types of terminals, such as the conventional form of wing-ear terminals, have not been found to be satisfactory either. The desired heating patterns are still difficult to achieve and the terminal ears, when made thin enough to provide better heat transmission, display a tendency to bend when subjected to the pressures caused by the power clamp over a period of time. Attempts to use thinner terminal ears which have been reinforced against bending have not been entirely satisfactory since there is always the danger that the ear, or the metal strip to which the ear is connected, will not be able to resist the extremely high temperatures to which it is subjected and will burn through.

SUMMARY OF THE INVENTION

This invention solves the problems mentioned above by providing a nonprecious metal drain bushing having a configuration and terminal arrangement which allows the bushing to be uniformly electrically heated to the required temperature level. A relatively wide terminal ear is employed which, along with a clamping area of reduced thickness, permits more uniform distribution of heating current. In addition, the dimensions of the critical elements are designed to permit continuous flow of the molten glass without requiring undue furnace control.

These and other features and aspects of the invention, as well as its various benefits, will be made clear in the more detailed description of the invention which follows.

BRIEF DESCRIPTION OF THE DRAWINGS

FIG. 1 is a partial vertical sectional view of an installed drain bushing of the present invention;

FIG. 2 is a bottom plan view of the bushing;

FIG. 3 is an end elevation of the bushing; and

FIG. 4 is an enlarged partial view of the terminal ear of the bushing, showing the reduced thickness of the clamping area.

DESCRIPTION OF THE INVENTION

Referring to FIG. 1 of the drawing, the drain bushing 10 of the present invention is shown installed beneath the opening or passage 12 leading to a glass melter, not illustrated. Flanges 14 extend outwardly from end walls 16 and abut the underside of the refractory lining 18 surrounding the passage 12. During start-up of the melting furnace molten glass flows through the passage 12 and into the drain bushing 10. It then flows through the drain holes 20 in the bushing which typically consist of holes in the bottom wall 24 aligned with holes of similar dimension in blocks 22 which are secured, as by welding, to the bottom wall 24 of the bushing.

Extending outwardly and downwardly from the ends of bottom wall 24 are terminal ears 26, which may be welded to the bottom wall but preferably are integrally formed therewith, being simply bent from the plane of the bottom wall to the desired angle. In operation, the terminal ears would be connected to water cooled power clamps 27, shown in phantom, which deliver the heating current to the bushing.

As shown in FIGS. 2 and 3, the bushing also has side walls 28 connected to the end walls 16 and the bottom wall 24. As can be seen, the flanges 14 extend from the side walls 28 as well as from the end walls 16, and these portions of the flanges would also abut the refractory lining surrounding the passage 12. The upper opening of the well or receptacle formed by the bushing walls is larger than the bottom wall 24 to which the side walls 28 are connected so that the side walls are sloped toward the bottom wall, thereby reducing any tendency of the molten glass to form dead spots of reduced flow.

The bottom wall 24 is quite thick compared to the relatively thin bottom wall previously employed, being at least about ¼" thick and preferably even more. In practice a thickness of about 5/16" has been found to perform satisfactorily. Such a thick wall has the advantage of being able to resist the danger of burn-through caused by the extremely high temperatures to which it is exposed. It also permits the bottom wall and terminal ears to be integral, since the portion of the bottom wall which is bent to form the terminal ears is able, due to its thickness, to resist further bending during operation which might otherwise be caused by the stresses exerted by the power clamp. By being able to bend a single strip of metal to form the ears rather than welding separate ears to the strip, fabrication costs are reduced and a potential weak area caused by welding is eliminated. Although the angle formed by the ears with the bottom wall can vary according to space requirements it has been found that an angle of 45° allows the power clamps to be readily attached and does not undesirably weaken the terminal ears. The fabrication of the overall drain bushing requires only that nonprecious metal sheets corresponding in shape to the two side walls and the two end walls to be welded to the strip which forms the bottom wall 24 and the ears 26. Of course the drain holes must also be drilled from the bottom wall and the blocks 22 welded to the underside of the bottom wall so that the holes in the blocks are aligned with the holes in the bottom wall.

Surprisingly, the desired pattern of heat distribution is provided by this arrangement even though the heating pattern normally is more concentrated when the terminal ears are made thicker. This phenomenon may be due to two features of the invention. First, the terminal ears and the bottom walls are relatively wide, being greater than about 1¼", which is considerably more than the width of bushing wing-ear terminals previously used. In practice, a width of 1¾" has been satisfactorily used. Second, the end portion of each terminal ear is of reduced thickness to accommodate the power clamp attachment. This is illustrated in FIG. 4, wherein end portion 30 of terminal ear 26 is shown to be of greatly reduced thickness compared to the thickness of the main body portion of the terminal ear. In practice, the last ¼" or so of the terminal ear is milled to a substantially reduced thickness of no greater than about one-half that of the main body portion of the terminal ear. A thickness of ⅛" has been found to perform well in practice. This relatively thin portion surprisingly does not result in bending of the end portion when subjected to the stresses exerted by the power clamp but apparently does allow the heating current to be distributed into the bushing as if the entire terminal ear were thinner. Burn-through of the relatively thin clamp attachment portion 30 of the terminal ear is prevented by using a water cooled clamp to maintain the temperature at this area below the point at which melting of the metal or burn-through would occur.

Only two drain holes are required in the bushing of the present invention. If the holes are too large the flow is very difficult to control. Molten glass tends to pour through them too fast even at temperatures at which the glass would be more viscous than desired for proper operation. If the holes are too small, which would be the case if too many drain holes were provided, hotter than desired temperatures would be required to maintain the glass at the desired degree of viscosity. In either case it is greatly preferable to provide conditions in the drain bushing which enhance the proper flow of molten glass and enable the temperatures to be maintained at desired levels rather than to try to control the temperatures in the bushing through exacting control of the melter. It has been found that two drain holes having a relatively large diameter permit desired operating conditions to obtain. In practice, holes of ⅜" diameter were found to perform quite satisfactorily.

The bushing of the present invention is of similar overall basic design to that of conventional drain bushings so that the size of the passageway leading to the bushing and the bushing mounting means can remain the same as always. Although other nonprecious metals may be used, a preferred material is Inconel 600, a commercially available alloy produced by International Nickel Company and containing chromium, nickel and iron.

As mentioned previously, the bushing can be readily fabricated by cutting the components of the bushing to size and welding them together. Although the relative thicknesses of the elements can vary, in a preferred embodiment the bottom wall and terminal ears were 5/16" thick while the side walls, end walls and flanges were only 1/16" thick. It was found that the bushing resisted erosion to a much greater degree than expected and surprisingly could be used for two or more campaigns.

It should now be clear that the present invention provides a simple but effective drain bushing design enabling it to be formed of nonprecious metal. Obviously, although a preferred embodiment has been described, certain specific details of the design can be changed without departing from the spirit of the invention.

What is claimed is:

1. A nonprecious metal drain bushing, adapted to be electrically heated, for draining molten glass from a glass melting apparatus, comprising:

an electrically conductive relatively thick bottom wall structurally connected to electrically conductive side walls and end walls to form a receptacle for molten glass, the thickness of the bottom wall being substantially greater than the thickness of the side walls and end walls;

the upper extremities of the side walls being spaced apart a distance greater than the width of the bottom wall, whereby the side walls converge from the upper end of the receptacle down to the bottom wall;

the bottom wall containing drain holes through which molten glass can flow;

an electrically conductive relatively thick terminal ear extending from each end of the bottom wall at an angle thereto;

each terminal ear comprising a main body portion and an end portion;

the width of the main body portion of the terminal ears extending in the same direction as the width of the bottom wall; and the end portion of the terminal ears being of substantially reduced thickness compared to the thickness of the main body portion of the terminal ears and being adapted to receive a power clamp for supplying heating current to the bushing.

2. A drain bushng according to claim 1, wherein the thickness of the bottom wall and the main body portion of the terminal ears is at least about ¼" and the thickness of the end portion of the terminal ears is not greater than about one-half that of the main body portion of the terminal ears.

3. A drain bushing according to claim 2, wherein the thickness of the main body portion of the terminal ears is substantially the same as the thickness of the bottom wall.

4. A drain bushing according to claim 3, wherein the thickness of the bottom wall and the main body portion of the terminal ears is approximately 5/16" and the thickness of the end portion of the terminal ears is approximately ⅛".

5. A drain bushing according to claim 1, wherein the terminal ears are integral with the bottom wall, having the same width as that of the bottom wall, and are bent out of the plane of the bottom wall.

6. A drain bushing according to claim 5, wherein the terminal ears make an angle with the bottom wall of approximately 45°.

7. A drain bushing according to claim 5, wherein the width of the bottom wall and terminal ears is greater than 1¼".

8. A drain bushing according to claim 7, wherein the width of the bottom wall and terminal ears is approximately 1¾".

9. A drain bushing according to claim 1, wherein the nonprecious metal is an alloy comprised of nickel, chromium and iron.

* * * * *